Jan. 23, 1940.  R. CONTINI ET AL  2,187,729
AIRPLANE WING
Filed July 12, 1938  2 Sheets-Sheet 2
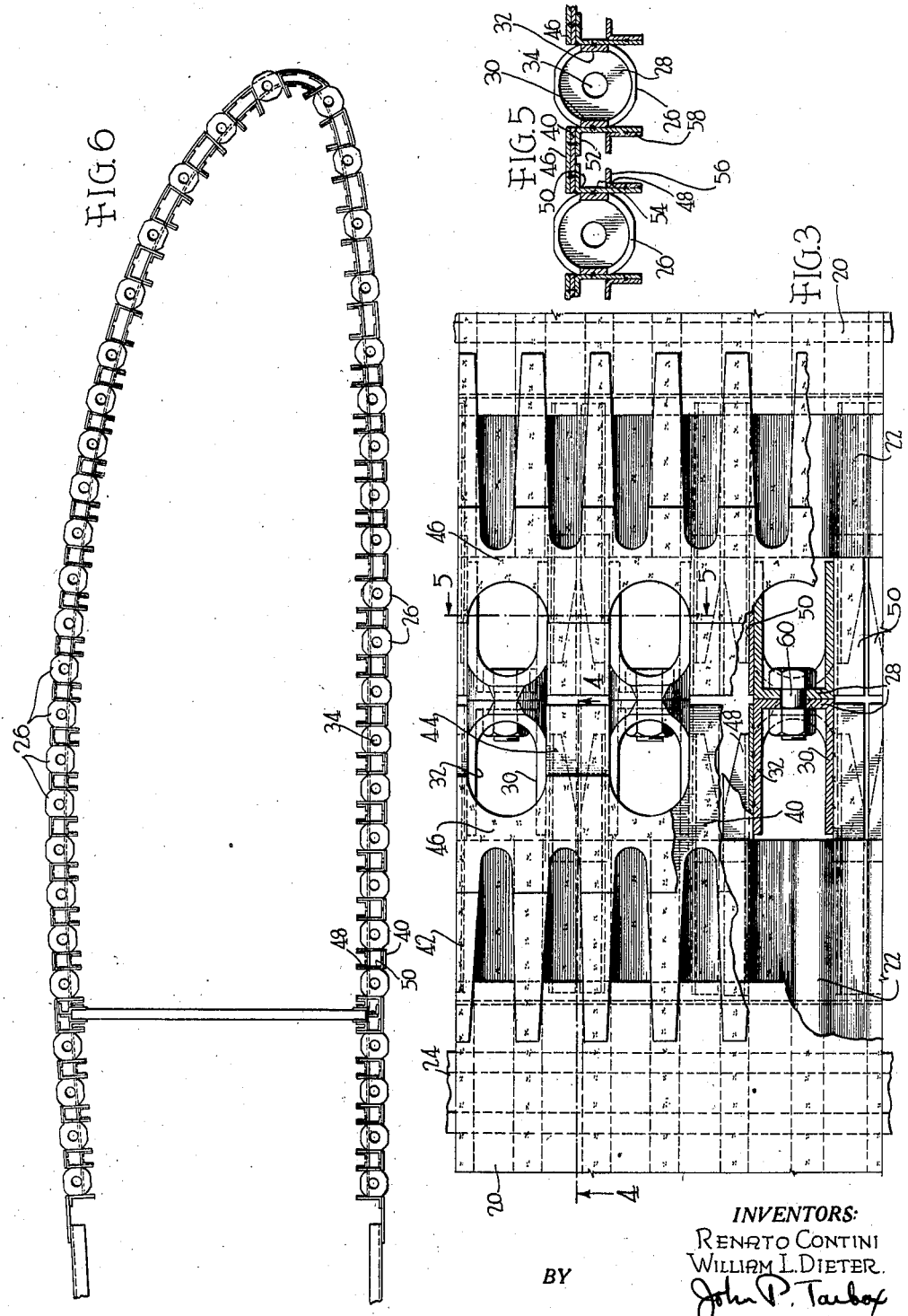
INVENTORS:
RENATO CONTINI
WILLIAM L. DIETER.
BY
John P. Tarbox
ATTORNEY Patented Jan. 23, 1940

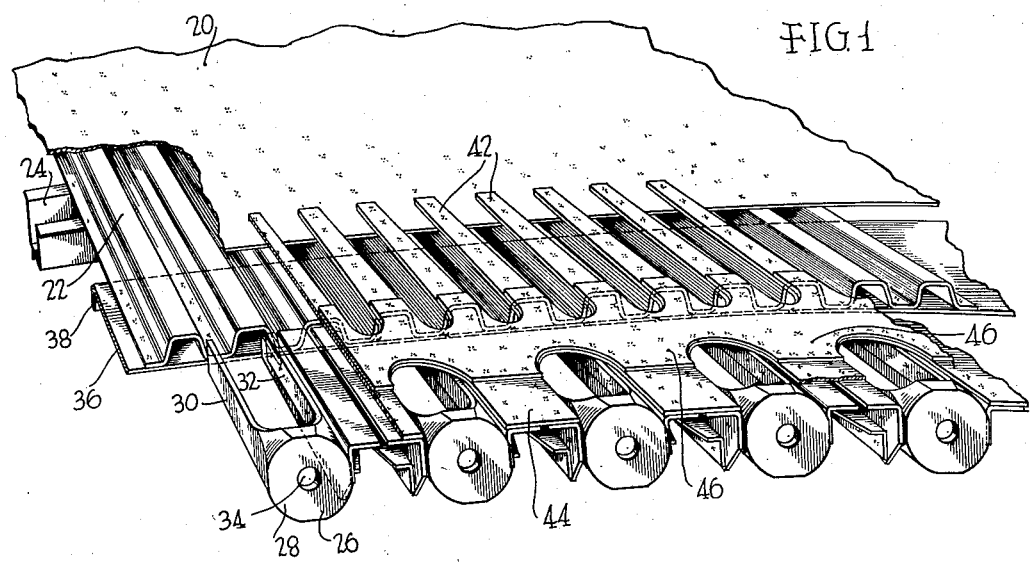
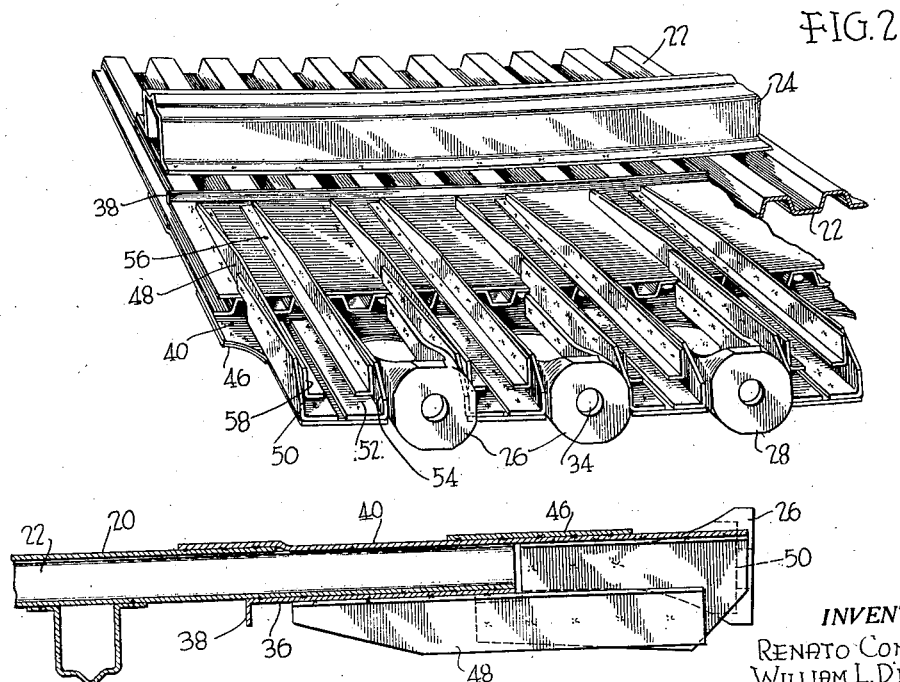

2,187,729

UNITED STATES PATENT OFFICE 2,187,729

AIRPLANE WING

Renato Contini and William L. Dieter, Philadelphia, Pa., assignors to Edward G. Budd Manufacturing Company, Philadelphia, Pa., a corporation of Pennsylvania Application July 12, 1938, Serial No. 218,748

12 Claims. (Cl. 244—124)

This invention relates to aircraft wings and more particularly to attaching means for sectionalized wings.

In wings of the sectional stressed skin type, some means must be provided for transferring the wing stresses from the surface contour of one section to the adjacent wing section or fuselage to which the wing is attached. Such means in order to be efficient should take the form of an attaching means which should be streamline with the wing and yet take the fullest advantage of stresses closely adjacent the surface, so that in transferring the tension and compression forces from the wing cantilever, the greatest possible moment is employed.

With these requirements in mind, it is an object of the present invention to provide an attaching means for the root end of a stressed skin airplane wing having the required lightness and strength as well as ease of fastening.

Another object of the invention is to provide a fastening means for the inboard edge of a stressed skin wing which is readily adapted for securing to the corrugated and flat plate wing surface structure common to many wing structures.

A further object of the invention is to provide a fastening means which may be readily electrically welded to the corrugated wing surface structure, and which may, therefore, be made of high strength stainless steel.

Yet another object of the invention is to provide a fastening means employing a series of narrow stirrups secured along the edge of the wing whereby maximum moment is obtained, the aerofoil contour maintained and space for threaded fastening means is provided.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein similar reference characters refer to similar parts throughout the several views—

Fig. 1 is a perspective of a portion of wing surface showing part of the attaching means;

Fig. 2 is a perspective of a portion of the wing surface showing the underneath part of the attaching means;

Fig. 3 is a top plan view of the attaching means secured to a mating structure;

Fig. 4 is a section through Fig. 3 taken on the line 4—4;

Fig. 5 is a section through Fig. 3 taken on the line 5—5;

Fig. 6 is a diagrammatic illustration showing roughly the location and spacing of the attaching means along the wing inboard edge contour, and the relative position of the shear web.

Referring to the drawings and more particularly to Fig. 1, there will be seen a section of the root edge of the stressed skin of an airplane wing, the same being made up of a surface skin 20 spot welded to a corrugated backing sheet 22, the corrugations extending in the direction of stress and capable of receiving loads in compression as well as tension. The skin surface and backing members are generally supported in their proper shape upon ribs and the cap strip or chord member of such a rib is shown at 24.

For the purpose of attaching the wing to an adjacent wing section, it will of course be understood to be preferable to provide an attaching means which is as near the skin surface as possible and yet lies within the wing structure contour, for in this manner, the aerofoil section is left undisturbed and the maximum bending moment resulting from the cantilever structure of the wing is transmitted, resulting in the lowest stresses. For this purpose a plurality of U-shaped attaching members 26 are provided, the general shape being that of a stirrup, each attaching member having a base portion 28 and side portions 30 and 32. The base is drilled as at 34 to receive a bolt or other means of securing the parts together in tension and the space between the side members 30 and 32 is sufficient to afford access to the bolt hole for the purpose of either inserting a bolt or placing a nut which will appear more clearly in Fig. 3.

In order to attach the U-shaped members to the corrugated backing and skin surface of the wing so that adequate tension and compression loads may be carried, an attaching plate 36 is welded to the underside of the corrugations, as shown in Fig. 2, the same having a stiffening flange 38. On the outside surface there is provided a forked splice plate 40 having projections 42 which are properly spaced for attachment to the nodes of the corrugated member 22 and which projections extend to the skin 20, and overlap the skin a short distance. The splice plate extends in an opposite direction and is again forked, the pitch between projections 44 in this case being arranged for reception of the spaced U-shaped members 26. A strengthening plate 46 also forked along both edges in a corresponding manner is built up on top of the plate 40, the forked projections matching those of the splice plate 40 but extending only a slight distance over the corrugated wing end and over the spaced projections 44. For attaching the side portions 30 and 32 with the U-shape attaching members or stirrups, angle pieces 48 and 50 are employed which are adapted to be spot welded to the splice plate 40 and the attaching plate 36. One face 52 of the angle member 50 is secured to the underside of the projecting portion 44 of the splice plate in proper position for its other face 54 to be subsequently fastened by welding to the side 32 of the U-member. The angle piece 48 is attached to the plate 36 by one face and spot welded either to the plate and through the node of the corrugated member 22 or to the plate alone at points between nodes, the piece being placed in such a position that its other face 58 lies against the face 54 of the angle member 50 so that the two faces 54 and 58 may be spot welded together.

After arranging a plurality of angle pieces in pairs and in their proper positions leaving the correct spacing between the opposed faces 54, the U-shaped clips or stirrups are spot welded to the faces 54 through their side portions 30 and 32.

As shown in Fig. 3 the same form of attaching means may be applied to the root end of one wing section and also to the outboard end of an adjacent section and the same will therefore be seen to afford an attaching means both capable of transferring compression and tension forces from one wing skin to the other as well as affording a means for readily attaching or detaching the sections. For this purpose, bolts 60 in tension may be employed and it will readily appear that access to the bolts is made easy by the open U-shape attaching members heretofore described. It will of course be understood that a fairing or cover plate may be subsequently laid over the section joint and that the joint is peculiarly adapted to receive such a covering since substantially all portions lie within the contour of the skin of the adjacent wing.

Though but a single embodiment of the invention has been illustrated and described, it is to be understood that the invention is not limited thereto but may be embodied in various mechanical forms. For example, the attaching means may be applied to other skin structures or obliquely to corrugated skin structures, and the size and spacing of the parts may be varied. As such and many other changes in construction and arrangement of parts may be made without departing from the spirit of the invention, as will be apparent to those skilled in the art, reference will be had to the appended claims for a definition of the limits of the invention.

What is claimed is:

1. A sectional wing attaching means comprising in combination with a stressed skin structure having a smooth skin and underlying corrugated member, a plurality of spaced stirrups arranged with their spaced side portions adjacent the side portions of the adjacent stirrups and aligned with and perpendicular to the section end, and means for securing said stirrups to said wing.

2. A sectional wing attaching means comprising in combination with a stressed skin structure having a smooth skin and underlying corrugated member, a plurality of uniformly spaced stirrups arranged with their side portions adjacent one another and aligned with and perpendicular to the section end, an attaching plate welded to the underside of said member, a splice plate welded to the upper side of said member, angle members welded by one face to the overhanging portion of said splice plate, on the underside thereof and having the other face welded to said stirrups.

3. An airplane wing having a stressed skin covering substantially the forward half of the top and bottom surfaces and the included leading edge, a plurality of U-shaped attaching members spacedly arranged along the edge of said stressed skin and secured to said edge, said attaching members each having a portion adapted for affixation to the supporting wing, the said portion being substantially in alignment with the center of thickness of said wing surface.

4. An airplane wing having a stressed skin covering substantially the forward half of the top and bottom surfaces and the included leading edge, an attaching means comprising a plurality of U-shaped members carried by the end of said stressed skin, said attaching means lying substantially within the wing contour, and the effective center of said attaching means being substantially aligned with the thickness center of the stressed skin thickness.

5. An airplane wing having a stressed skin covering substantially the forward half of the top and bottom surfaces and the included leading edge, said skin comprising a flat surface plate and a corrugated backing member with the corrugations arranged in substantially the direction of stress, a forked plate spot welded to the nodes of the corrugations and said plate on the outside of said skin, an attaching plate welded to the nodes of said corrugated member on the inside of said skin, top and bottom angle pieces extending substantially in the direction of said corrugations welded by one face to said forked plate and said attaching plate and welded together by their other faces, a plurality of stirrups having spaced side members, at least one of said angle pieces being welded to each side face of said stirrup.

6. An air plane wing having a stressed skin covering substantially the forward half of the top and bottom surfaces and the included leading edge, said skin comprising a flat surface plate and a corrugated backing member with the corrugations arranged in substantially the direction of stress, an attaching plate spot welded to the nodes of said corrugated member, stress members spot welded to said attaching plate and extending substantially in the direction of stress and a plurality of stirrups having their side faces welded to said stress members.

7. An airplane wing having a corrugated member forming a part of its skin, said corrugated member having its corrugations extending substantially in the direction of stress, a splice plate welded to the nodes of said corrugated plate on the outside thereof and extending beyond the end of said corrugated member, a plurality of spaced stirrups having a base portion adapted to receive removable fastening means, and side portions, and means for securing said side portions to the underside of said splice plate.

8. An airplane wing having a corrugated member forming a part of its skin, said corrugated member having its corrugations extending substantially in the direction of stress, a splice plate welded to the nodes of said corrugated plate on the outside thereof and extending beyond the end of said corrugated member, a plurality of spaced stirrups having a base portion adapted to receive removable fastening means and side portions, and means for securing said side portions to the underside of said splice plate, said means comprising angle pieces having one face spot welded to said splice plate and the other face spot welded to said side portions.

9. An airplane wing having a corrugated member forming a part of its skin, said corrugated member having its corrugations extending substantially in the direction of stress, an attaching plate spot welded to the nodes of said corrugated member, a plurality of stirrups having a base portion adapted to receive attaching means and side portions and means for securing said side portions to said attaching plate.

10. An airplane wing having a corrugated member forming a part of its skin, said corrugated member having its corrugations extending substantially in the direction of stress, an attaching plate spot welded to the nodes of said corrugated member, a plurality of stirrups having a base portion adapted to receive attaching means and side portions and means for securing said side portions to said attaching plate, said attaching means including an angle piece having one face spot welded to said plate.

11. An airplane wing having a stressed skin covering substantially the forward half of the top and bottom surfaces and the included leading edge, attaching means for securing said wing to an adjacent section, said attaching means comprising a plurality of spaced U-shaped stirrups arranged along the root edge of said skin having a base portion adapted to receive fastening means, said stirrups being arranged for access to said base portion from the outside of said skin.

12. In a wing attaching means, a spanwise corrugated wing surface member, a plurality of stirrups and means securing said stirrups by the sides thereof to the member, said stirrups lying substantially in the plane of said member.

RENATO CONTINI.
WILLIAM L. DIETER.